United States Patent
Huttunen et al.

(10) Patent No.: US 6,356,761 B1
(45) Date of Patent: Mar. 12, 2002

(54) METHOD AND ARRANGEMENT FOR FINDING INFORMATION

(75) Inventors: Ari Huttunen, Helsinki; Jari Arkko, Kauniainen, both of (FI)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 09/138,544

(22) Filed: Aug. 24, 1998

(30) Foreign Application Priority Data

Sep. 4, 1997 (FI) .................................................. 973600

(51) Int. Cl.⁷ .............................. H04B 7/26; H04Q 7/20
(52) U.S. Cl. ....................................... 455/456; 455/414
(58) Field of Search ................................. 455/456, 466, 455/556, 557, 414, 457, 566, 412, 432, 517; 340/905

(56) References Cited

U.S. PATENT DOCUMENTS

| 5,543,789 A | * | 8/1996 | Behr et al. ................... 340/995 |
| H1641 H | * | 4/1997 | Sharman ....................... 455/466 |
| 5,793,762 A | * | 8/1998 | Penners et al. .............. 370/389 |
| 5,999,126 A | * | 12/1999 | Ito ................................ 455/456 |
| 6,014,090 A | * | 1/2000 | Rosen et al. ................. 340/905 |
| 6,047,327 A | * | 4/2000 | Tso et al. ..................... 709/232 |

FOREIGN PATENT DOCUMENTS

| EP | 0 647 076 A | 4/1995 |
| FR | 2 726 927 A | 5/1996 |
| WO | 93/01665 A | 1/1993 |

OTHER PUBLICATIONS

Proceedings of the Vehicle Navigation and Information Systems Conference, Ottawa, Oct. 12–15, 1993, pp. 49–52, XP000448510, J. Hellaker et al., "Real–Time Traveller Information—In Everyone's Pocket"—A Pilot Test Using Hand–Portable GSM Terminals.

* cited by examiner

Primary Examiner—Vivian Chang
Assistant Examiner—Duc Nguyen
(74) Attorney, Agent, or Firm—Nixon & Vanderhye P.C.

(57) ABSTRACT

The present invention relates to a method and an arrangement for finding information in a communications system comprising a circuit switched network, a packet switched network and a link therebetween. A user related location information is obtained by the circuit switched network and the packet switched network is subsequently utilized using said location information for finding the desired information. The invention relates further to a mobile station to be used in accordance with the invention.

23 Claims, 7 Drawing Sheets

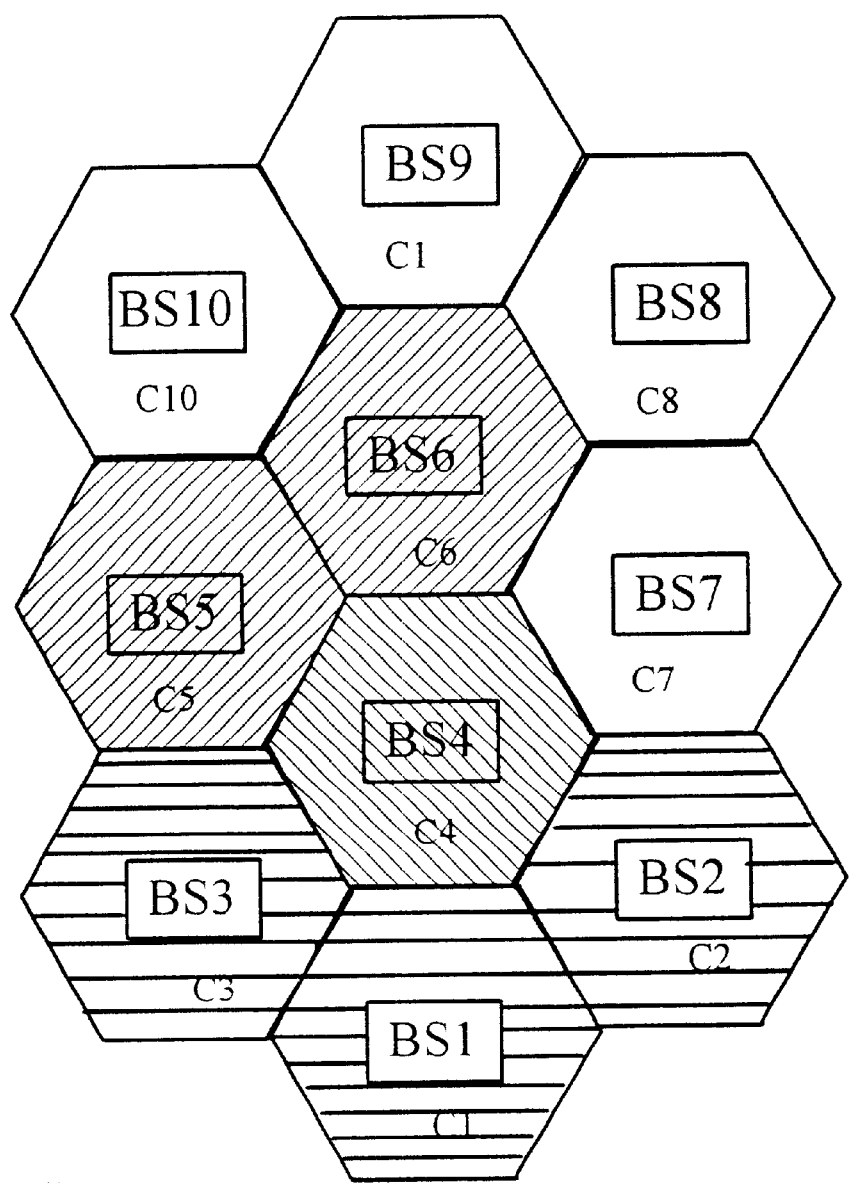
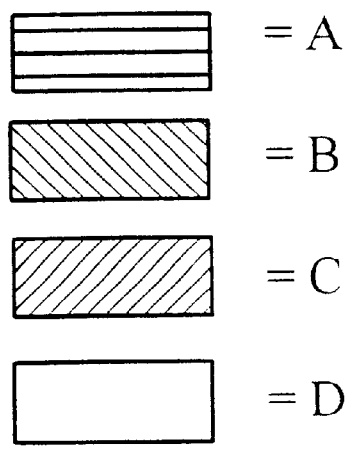
Fig.2

| http-address | IP-address |
|---|---|
| www.lmf.ericsson.fi | 161.187.34.1 |
| www.helsinki.tele.fi | 121.134.21.2 |
| www.kallio.helsinki.tele.fi | 121.134.21.1 |

| Service (eg. bus time tables) | | | 200 |
|---|---|---|---|
| A | base stations 1-3 | 161.187.43.1 | 204 |
| B | base stations 4,5 | 161.187.53.3 | |
| C | base stations 6-9 | 162.654.53.3 | |

201 — A
202 — base stations 4,5
208 — B

| FINLAND | | | 205 |
|---|---|---|---|
| A | base stations 1-10 | 123.234.23.3 | 207 |
| B | base stations 30-34 | 123.345.45.2 | |
| C | base stations 20-29 | 123.675.34.1 | |

| 210 | 212 | 214 |
|---|---|---|
| IP-address of the computer | DNS server address of the ISP to be reached | Desired address eg. regioninfo.com |

Fig. 7

| 220 | 222 | 224 |
|---|---|---|
| IP-address of the ISP server (conf. Bv AN) | IP-address of the computer | Resolved address of the desired destination |

Fig. 8

METHOD AND ARRANGEMENT FOR FINDING INFORMATION

FIELD OF THE INVENTION

The present invention relates to a method for finding specific information, such as documents and/or files. The invention relates further to an arrangement and also to a mobile station for accomplishing such searching operations.

BACKGROUND OF THE INVENTION

Ever increasing amount of various kinds of information is provided e.g. by a communications network structure known as Internet. The Internet is a global open communications network connecting through e.g. PSTNs (Public Switched Telephone Network) and/or ISDNs (Integrated Services Digital Network) and suitable gateways a great number of local area networks, such as networks of various companies, universities and other organizations and e.g. MANs (Metropolitan Area Network). The two most often used communication protocols for the Internet are TCP and IP protocols (Transport Control Protocol resp. Internet Protocol). In most cases various services are provided utilizing so called HTTP protocol (HyperText Transfer Protocol) of a WWW (World Wide Web), which provides a graphical Internet interface for a data processing device, such as a microcomputer or a PC (Personal Computer) or a workstation. As the skilled persons knows, the WWW contains HTML documents (HyperText Markup Language) i.e. "hyperdocuments", one such document forming one entity which can contain text, pictures, even moving pictures, sound and links to other documents. A hyperdocument usually has so called "web master" who updates the document data.

These documents include a great and ever increasing amount of various information. A part of this information may be e.g. information about cities or other geographically limited areas, tourist attractions, shops, services, time tables for trains and busses, companies, libraries, schools etc. which is available in the Word Wide Web. Access to this information would be useful for those who have a current need to know about these matters and interest.

Conventionally the WWW pages or documents are located using a "http://www.xxxx.xx" type address, where the www.xxxx.xx is the address of the page or document in the Internet. Finding a particular page requires a precise knowledge of the actual Internet http address. However, unknown WWW pages can also be located by using a known collection (or a "list") of the WWW pages, such as 'Lycos', or by using some search engine available in the WWW, such as 'Alta Vista', which have been created to assist the WWW users for locating various documents.

It has become possible to access the WWW pages even by means of a mobile station interface or terminal. The suitable apparatus for this comprise e.g. various portable computers which are provided with a possibility of communicating through a mobile station interface. All major manufacturers of mobile phones do also-provide means for connecting a computer to the communications networks, such as to the Internet, by means of the mobile phone. The mobile station can be either an analog or a digital mobile phone. In addition, some manufacturers do even offer an integrated data processing and mobile station apparatus. In these the integrated portable unit comprises CPU (Central Processing Unit), necessary memory means, a display, a keypad and means for mobile communications and web browsing. Some manufacturers and the publicity often refer these integrated portable communication units as "communicators".

SUMMARY OF THE INVENTION

The current methods for finding information which is available from the WWW do not provide any easy and fast way to access such a local information the user might wish to obtain. It is already possible that a particular WWW service provides information (e.g. a map, time tables, tourist information etc.) concerning a particular geographical place, but the problem is that the user does not always know where he/she actually is when requesting the information. The other problem is that he/she may not even know the address of the local information service, and is not able or capable to search for this kind of address, as he/she usually does not find out the right search criteria. In either case the user must, however, be able to request an exactly correct address, as the address name or the location may not be familiar for the user, or they can even be abbreviations. To obtain the necessary information so as to receive the correct address may take essentially long time, even longer than just simply finding out e.g. an outlet selling paper maps or an tourist information centre distributing printed information. This kind of searching also increases the traffic loads in the used networks and is slow/expensive when cellular connections are used. There are also a lot of other kinds of such per se useful local information which the user is not able to find as he/she is not able to figure out the actual address thereof in the web, or the correct search words for the search engine provided by a web server or he/she receives too many "hits" to go through.

Therefore it is an object of the present invention to overcome the disadvantages of the prior art solutions and to provide a new type of solution for finding information, such as documents and/or files available in a communications network, and more precisely, documents and/or files giving information about matters and interests relating to a predetermined area where the user exist at the particular moment.

An object of the present invention is to provide a method and an arrangement by means of which a mobile station (terminal) user is provided with an eased access to documents and/or files including information of a certain area limited geographically by the mobile network the user is currently connected to.

An object of the present invention is to provide a method and arrangement by means of which the user of a mobile station, which is connected to data network through a PSTN and PLMN, is provided with a selection of documents which relate to the geographically area limited by the mobile network the user currently is, and also with a possibility to browse said documents.

Other objects and advantages of the present invention will be brought out in the following part of the specification taken in conjunction with the accompanying drawings.

The objects are obtained by the disclosed method for finding information to a mobile user terminal through a communications network. The inventive method is comprising the steps of establishing a connection between the mobile user terminal and a mobile network operationally connected to said communications network, determining information about the location of the mobile user terminal by means of network apparatus of said mobile network, combining said location information determined by the network apparatus with a request to receive local information dependent from said location information from the communications network, requesting an access to a source of the local information in said communications network on basis of said combination of the location information and the request to receive local information, and retrieving desired local information dependent from said location information.

According to an alternative the invention provides a method for finding information in a communications system comprising a circuit switched network, a packet switched network and a link therebetween, wherein user related location information is obtained by the circuit switched network and the packet switched network is subsequently utilized using said location information.

The invention provides further an arrangement for finding information to a mobile user terminal through a communications network. The arrangement comprises mobile network apparatus comprising base station means for establishing an air interface between the mobile user terminal and a mobile switching center for connecting the mobile network operationally to said communications network, wherein the arrangement is such that information about the location of the mobile user terminal is determined by means of said mobile network apparatus, and means for combining said location information determined by the mobile network apparatus with a request to receive local information dependent from said location information from the communications network, said mobile user terminal being capable of requesting an access to a source of the local information in said communications network on basis of said combination of location information and the request and retrieving desired local information dependent from said location information to be displayed to the user.

According to an alternative an arrangement for finding information in a communications system comprising a circuit switched network, a packet switched network and a link therebetween is provided, wherein user related location information is arranged to be defined by the circuit switched network and the packet switched network is adapted to utilize said location information when an access to an information dependent from said location information is requested.

In addition, the invention provides further a mobile station arranged to communicate with a mobile network via an air or radio interface through base station means, said mobile network being arranged to determine the current location information of the mobile station. The inventive mobile station comprises means for establishing a connection to a communications network through said mobile network, means for combining said location information determined by the mobile network with a request to receive local information dependent from said location information from the communications network, wherein said mobile station is capable of requesting an access to a source of the local information in said communications network as a response to said combining and retrieving desired local information dependent from said location area information to be displayed to the user.

Several advantages are obtained by means of the present invention, since the solution provides a simple, reliable and cost effective manner for accessing documents and/or files which relate to a certain geographical area, such as to a city or county, or to even a certain city district. The invention provides an eased and in some instances even automatic access to local information relating to an area the user is at that moment of connection, said information preferably being in the form of WWW documents. The user does not need to be aware of the actual location he/she currently is, or has just roamed in, and he/she is still provided with an accurate information concerning that area. An example of this is a situation where the user wishes to obtain time tables for trains departing from/arriving to a railway station which is closest to the area defined by the mobile network within which the user is currently located, whereby the user can easily use the local information sites. The user can request the time tables without a need to know the geographical location of the railway, and he/she does not need to know the exact WWW page address either. In addition, the local advertisers are provided with a media for announcing directly through the web to those persons only who actually are within their local business area. In case the local information service provider is using a common "front page" or similar frames to all pages, the service provider may then sell advertisement space to the local companies. A further advantage in some instances may be that the local authorities are enabled more easily to control and manage that local information which is distributed through servers serving the users of the present invention than would be the case in a "fully open" network.

In the following the present invention and the other objects and advantages thereof will be described in an exemplifying manner with reference to the annexed drawings, in which similar reference characters throughout the various figures refer to similar features.

BRIEF DESCRIPTION OF THE DRAWINGS

FIG. 2 shows a general view of the coverage areas of ten base stations;

FIG. 6 illustrates examples of records included in an access node;

FIG. 7 shows a schematic presentation of a data packet information sent from a PC to an access node;

FIG. 8 shows a schematic presentation of a data packet information sent from the access node to the PC.

DETAILED DESCRIPTION OF THE DRAWINGS

Figure 1:
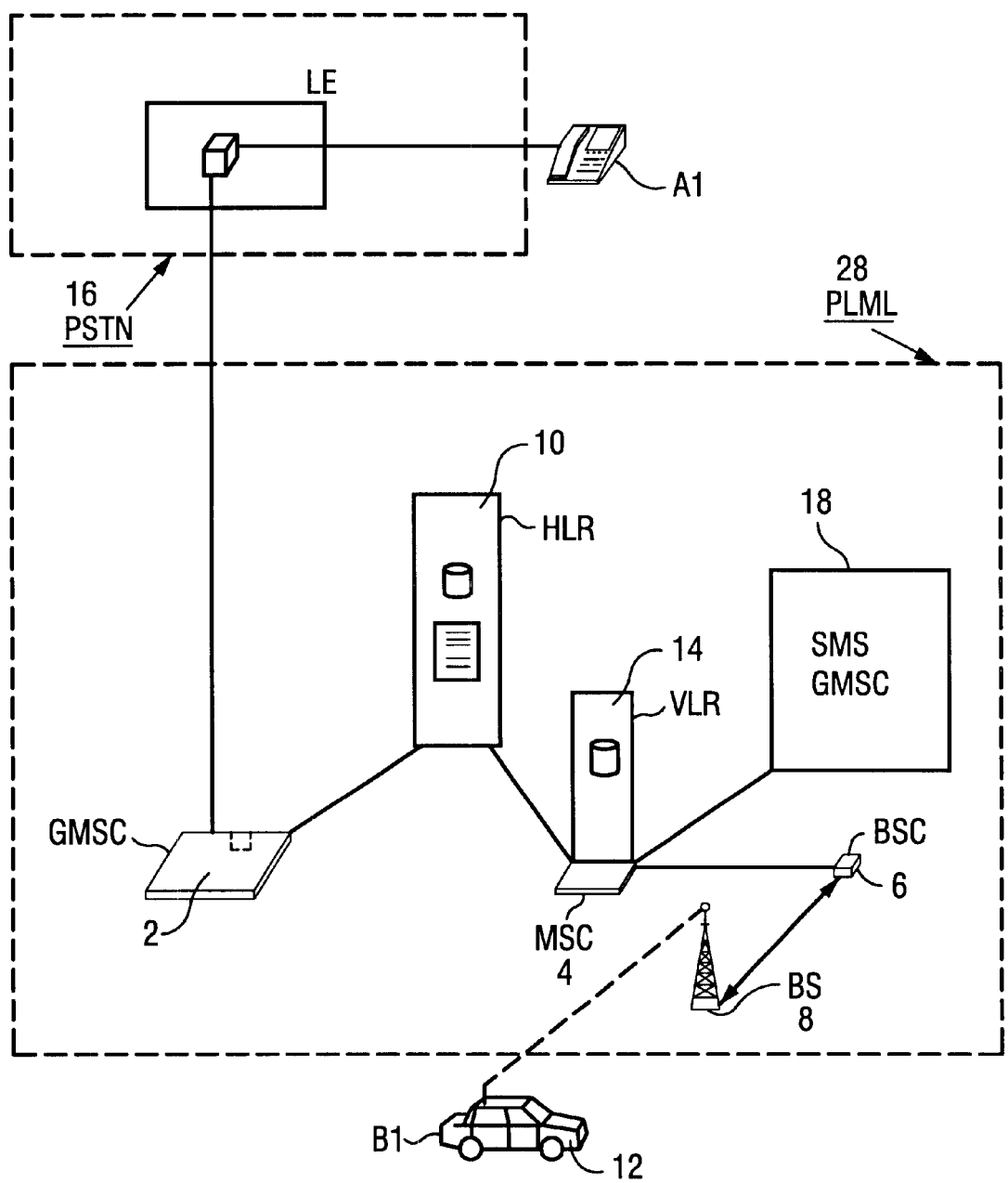
FIG. 1 shows a general schematic presentation of one cellular telephone network.

FIG. 1 is a simplified presentation of one GSM network arrangement according to the present invention. The GSM network is well specified e.g. in the GSM recommendations, and the network architecture is described in more detail in recommendations GSM 03.02 or the revised versions thereof. However, while the invention is mainly described in the context of an exemplifying cellular telephone network using GSM terminology, those skilled in the art will appreciate that the present invention can be implemented in any cellular system. Furthermore, it is to be noted that for clarity reasons only those parts of a mobile network structure are shown which are considered as necessary for the purposes of illustrating this example of the invention. However, the skilled person is well aware of the fact that the mobile networks may normally comprise also other necessary apparatus than those illustrated and that a great number of mobile networks and also ordinary fixed land line networks may cooperate and interchange with each other. These are not, however, explained in more detail as they are known to skilled man in the art.

The GSM based public land mobile network (PLMN) 28 includes a gateway mobile telephone services switching center (GMSC) 2 which is connected to several mobile services switching centers (MSC) 4. Each of these is, in turn, connected to a plurality of base station controllers (BSC) 6. Each of the base station controllers 6 is connected to a plurality of base stations (BS) 8, each of which supervises a certain geographical area, referred to as a cell. The PLMN network includes further a database, a so called home location register (HLR) 10, which is connected to the gateway 2 or a central mobile telephone switching services center, and also to all local mobile telephone switching centers 4 in the PLMN network. Those mobile units 12 which are subscribers of the mobile telecommunications network, are registered in the HLR 10. Each local mobile telephone switching center 4 includes further a local database called as a visitor location register (VLR) 14, into which all such mobile stations 12 which are located within the area of one of the cells handled by that local mobile telephone services switching center 4 at any given moment are registered. The mobile services switching centers 4 are further connected to a public switched telephone network (PSTN) or similar facility, e.g. an integrated services digital network (ISDN) 16. The necessary links between different components of telephone network systems are well known in the art.

FIG. 1 shows only one of the local mobile services switching centers (MSC) 4, base station controllers (BSC) 6, visitor location registers (VLR) 14 and base stations (BS) 8. Multiples of these elements have been omitted for reasons of clarity. The mobile station unit 12 belonging to the PLMN and located at that moment within a cell area controlled by the VLR 14 is registered temporarily in that VLR 14 and permanently in said HLR 10 at the same time. The HLR 10 is always informed of that VLR in which the mobile station 12 is registered at that moment of time. The mobile station 12 communicates voice and/or data with the nearby base station 8 and the MSC 4.

Each of the mobile subscriptions includes in the HLR 10 information relating to an IMSI (International Mobile Subscriber Identity) and MSISDN (Mobile Subscriber ISDN number) as well as to the location information (VLR number), basic telecommunications services subscriber information, service restrictions and supplementary services. A mobile station (MS) 12 roaming in an area of a MSC 4 is controlled by the VLR 14 which is responsible for this area. When the MS 12 appears in the location area, the VLR initiates the updating procedure. The VLR 14 has also a database which includes e.g. the IMSI, MSISDN and location area in which the MS is registered according to e.g. GSM 09.02 specification. The location area identification includes mobile country code, network code and location area code identifying the location area. So called cell global identification includes further a cell identity, and is included in the messages between the MS 12 and the MSC 4. This information is used as an identification indicator to find the mobile station MS 12 location.

The mobile systems further include a possibility to send short messages of a short message system (SMS) to the registered mobile stations 12, who have subscribed this SMS service, and are located within a determined area. In the GSM system a SMS GMSC (SMS Group Message Service Center) interface is provided between the mobile network and the network providing the access to the short message service center for the short messages to be delivered to the mobile stations 12. The service center 18 sends the messages to the mobile subscribers using the same network elements as was discussed above and defined by the referred specifications. The SMS message contains e.g. the receiver identification, sender information, time stamp etc. The lines of FIG. 1 indicate the connection between the mobile station 12 and the SMS GMSC 18. In order to get the SMS service it is usually necessary for the user to be within such a service area which is providing the SMS service and that the user has selected (activated) the information he/she wants to receive. The user accomplishes this by codes using the menu of the mobile unit 12. By means of the codes the network then recognizes those mobile stations 12 desiring the service.

An arbitrary geographic area may be seen divided into a plurality of contiguous radio coverage areas or cells, as is shown in FIG. 2. While the system of FIG. 2 is illustrated so as to include only ten cells (C1 to C10), the number of cells may in practice be essentially larger. A base station is associated with and located within each of the cells, these base stations being designated as BS1 to BS10, respectively. The base stations are connected to the base station controller (BSC 6 of FIG. 1, not shown in FIG. 2). The base station can be located at the centers of the cells, or near the border line of it's cell or otherwise away from the center of the cell concerned. In addition, the shape of an individual cell may vary from the disclosed. A cell may also cover one or several base stations. The cells are grouped into four groups A to D, wherein each group may include one or more cells, as is marked by corresponding markings. Each group is seen by the system as one unit, i.e. one area (see e.g. FIG. 6).

Figure 3:
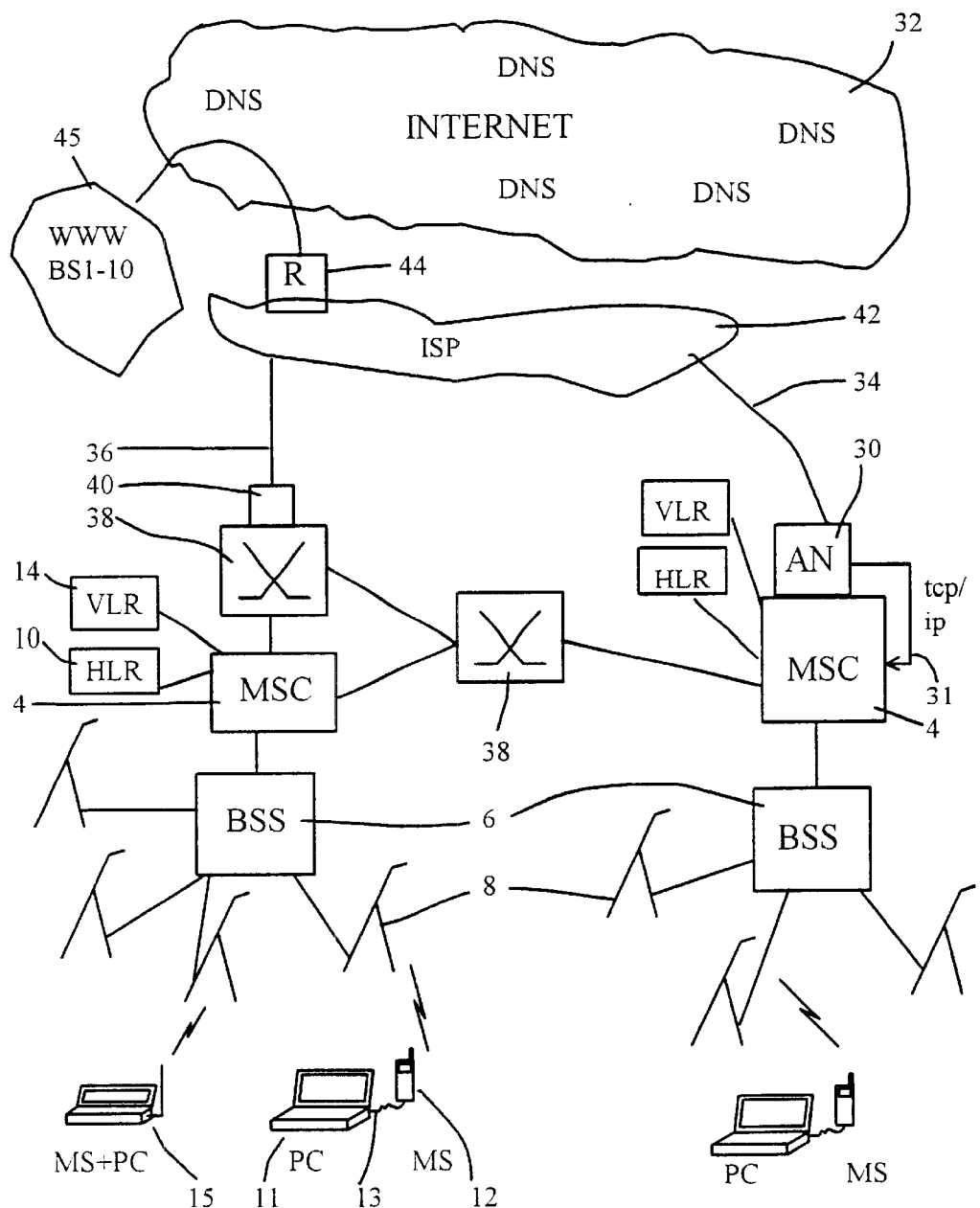
FIG. 3 shows a general view of one arrangement used in the present invention.

FIG. 3 discloses one arrangement which can be used in the invention. Mobile Switching Centers (MSC) 4 are provided with an access to the multiprotocol Internet 32 by access nodes (AN) 30. Even though only two ANs are disclosed, it is to be understood that in practice the number of the ANs may be essentially greater, and that the number of ANs is also increasing continuously. The users of the Internet 32 have made a contract with a Internet Service Provider (ISP) 42, who provides the communications connection to the Internet from the user computer 11. The user may be connected to the Internet via a fixed or a mobile network. However, there may be some differences in the connection regarding the mobile system, when e.g. the GPRS (General Packet Radio System) is concerned, but the service from the network is available for the user also in this case. Typically the connection to the Internet is accomplished by means of the existing PSTN 16 and/or PLMN 28. The PSTN provides a data communications connection between the user and the ISP and e.g. between a first user and a second user.

As the PSTN and PLMN comprise a circuit switched network, the connection is reserved solely for handling of the call between the user 12 and the ISP 42 (the packet switched network thereof). The arrangement is the same in the case of two users. The local exchange 38 (such as an AXE by Telefonaktiebolaget L M Ericsson) comprises a group switch/time switch (GS/TS) 60 shown in FIG. 4. The GS/TS 60 is connected to the users via a plurality of POTS (Plane Old Telephone System) connection lines 62 as well via a plurality of ISDN (e.g. 2B+D) connection lines 64. The GS/TS is 60 is connected further to plurality of E1/T1 trunk connections (not shown) through which the communications interconnections with the other exchanges of the system are established. Other techniques can also be used in this context.

When the user desires to have an Internet connection, he/she calls to the ISP 42. The call connection is established by the PSTN and passes through at least the local exchanges and perhaps one or several transit exchanges which are connected or interconnected through trunk lines (not shown) or in case of the PLMN through the MSC. In case of the POTS call, the call is routed from the GS/TS 60 to a modem pool 72 of the exchange 38, where it is demodulated and output back over the DL2 interface connection 74. The data communications is then routed back through the GS/TS 60 and over the DL2 interface connections (only one of these shown) to the controller 76. There the protocol of the data communications is switched from the protocol required for transmission over the POTS connection, e.g. PPP (Point-to-Point Protocol) or SLIP (Serial Line Internet Protocol), to the protocol required for transmission over the data communications (e.g. Ethernet) link 34,36 (e.g. Transmission Control Protocol/Internet Protocol; TCP/IP). The ISP 42 through connects the call to the access point 44 of the Internet.

The group switch of the exchange is connected to the access server 78 directly by DL2 interface 74 or by the E1/T1 connection 84 when POTS is concerned or by a PRI (Primary Rate Interfaces) 86 when the ISDN is concerned. The access server 78 terminates the incoming data communication channel, authenticates the connections dialed up, allocates the IP addresses for the connections dialed up and routes by a router 90 IP packets (see FIGS. 7 and 8) to the data network 42 of the ISP and vice versa. The access server 78 may be connected to the network 42 of the service provider e.g. by means of a data connection 94 using e.g. an Ethernet type link.

Figures 4, 5:
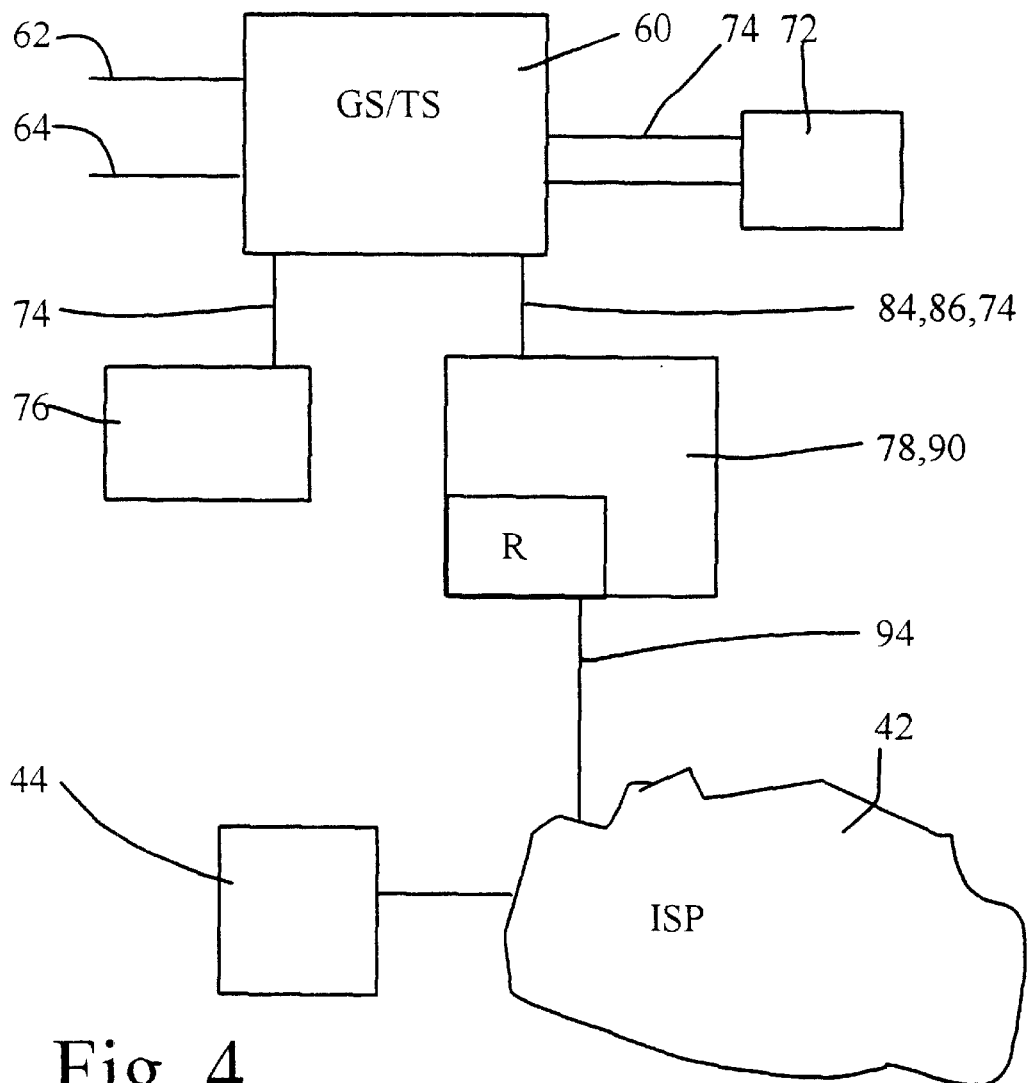
FIG. 4 shows an embodiment of the exchange used in connection with the present invention.
FIG. 5 illustrates an IP-address table.

FIG. 3 discloses also domain name servers (DNS). The DNS is a name/address server that contains a table for the actual IP-addresses corresponding to the http addresses. One example of such IP-address table is illustrated by FIG. 5, wherein it can be seen that each of the http addresses in field 192 has a number string forming the IP protocol address in field 194.

The Internet includes a significant amount of various information in the various databases connected therein, from which, however, only an essentially small part relates to the local area within which the mobile station 12 and thus the user thereof currently is. The information is usually in the form of graphical documents which are displayed to the user by means of a display after they have been successfully retrieved from a WWW server database or several databases to the user terminal means, such as to the PC 11. FIG. 3 discloses WWW server database 45 which includes information concerning base stations 1–10. It also discloses a connection from the ISP through the router 44 to said server 45 via the Internet. The desired information packet can be found by means of the location information from said WWW server 45, as will be described in more detail later on in this specification.

The mobile station 12 is connected to the PC 11 e.g. by means of a data card 13, e.g. a DC 23 type data card produced and offered by Telefonaktiebolaget L M Ericsson. The PC has a software of its own (e.g. for enabling the operation thereof). The part of the software enabling the Internet connection is usually received from the internet service provider. In addition, it is required that the used browser, such as the PC 11, is capable of reading and handling SMS location information from the MS 12. This approach requires also that the base stations and/or the control means thereof (BSCs) are able to transmit the local address information as a specific code dedicated for this use. The SMS messages are formed by the message service center 18, as was disclosed by FIG. 1.

It is noted herein that the data processing device 11 and the mobile station 12 forming the mobile user terminal of the above example can be of some other type as well, such as an integrated unit of mobile station and a computer, as is designated by 15. A mobile station can be provided with a capability of receiving and displaying the desired information, which in some instances may even be in the form of text or voice messages only instead of a graphical document.

The manner in which the access node AN may be configured in accordance with the present invention is now described in conjunction with the function block diagram shown in FIG. 6. The database of the AN 209 may be divided into two sections including a service based records database 200 and a location based records database 205. The service based records database 200 includes base station records 202 corresponding to the area information. Each of the base station records includes a base station identifier 208, e.g. an unique number for each base station. Each base station records database may also include a group identifier 201 (e.g. A,B,C . . . ). A group identifier may group a plurality of base stations to belong to a certain area. The base station identifier 208 is received from the MSC. The service based records database 200 further includes an IP-address 204 of the WWW server which is dependent from the area of the base station identifier, i.e. of the WWW server the user wanted to have a connection in order to reach the desired information on basis of the base station location (such as server 45 in FIG. 3).

Correspondingly, the location based records database 205 includes base station records 206 corresponding to the area information. Each of the base station records 206 includes a base station identifier 208. Each base station records database may also include a group identifier 201 (e.g. A,B,C . . . ). The base station identifier 208 is received from the mobile network. The location based records database 205 further includes an IP-address 207 of the WWW server which is dependent from the area of the base station identifier, i.e. of the WWW server the user wanted to have a connection in order to reach the desired information on basis of the base station location.

FIG. 7 discloses a schematic presentation of the form of a data packet which is to be send from the computer 11 to the AN 30. The information includes the IP address of the computer in field 210, DNS server address of the internet service provider in field 212 and the desired address accepted by the system, e.g. the address "regioninfo.com", in field 214. The data packet of FIG. 8, which is configured by the AN in 220 and transmitted back from the AN to the PC IP address of the internet service provider ISP, contains the following fields: IP address of the ISP server in 220, IP address of the computer in 222 and the resolved IP address of the desired destination in 224.

The operation of the invention will now be described in more detail.

The essential feature of the invention is that it provides a possibility for finding e.g. one or several WWW pages on basis of the (geographical) location information based on the location of the mobile subscriber (i.e. mobile station 12). In other words, it provides an access, by means of a circuit switched network (such as the mobile network), from a predetermined area to an area determined information included in a packet switched network, such as to local WWW documents and/or files of the Internet. Said location information is identified and determined by the mobile telephone system which is capable of determining the area the subscriber is currently roaming, or by a fixed land line telephone system. This local area can be determined by means of one base station or several base stations. However, other means can also be used for determining the location of the MS than the location of the base station(s).

Figure 9:
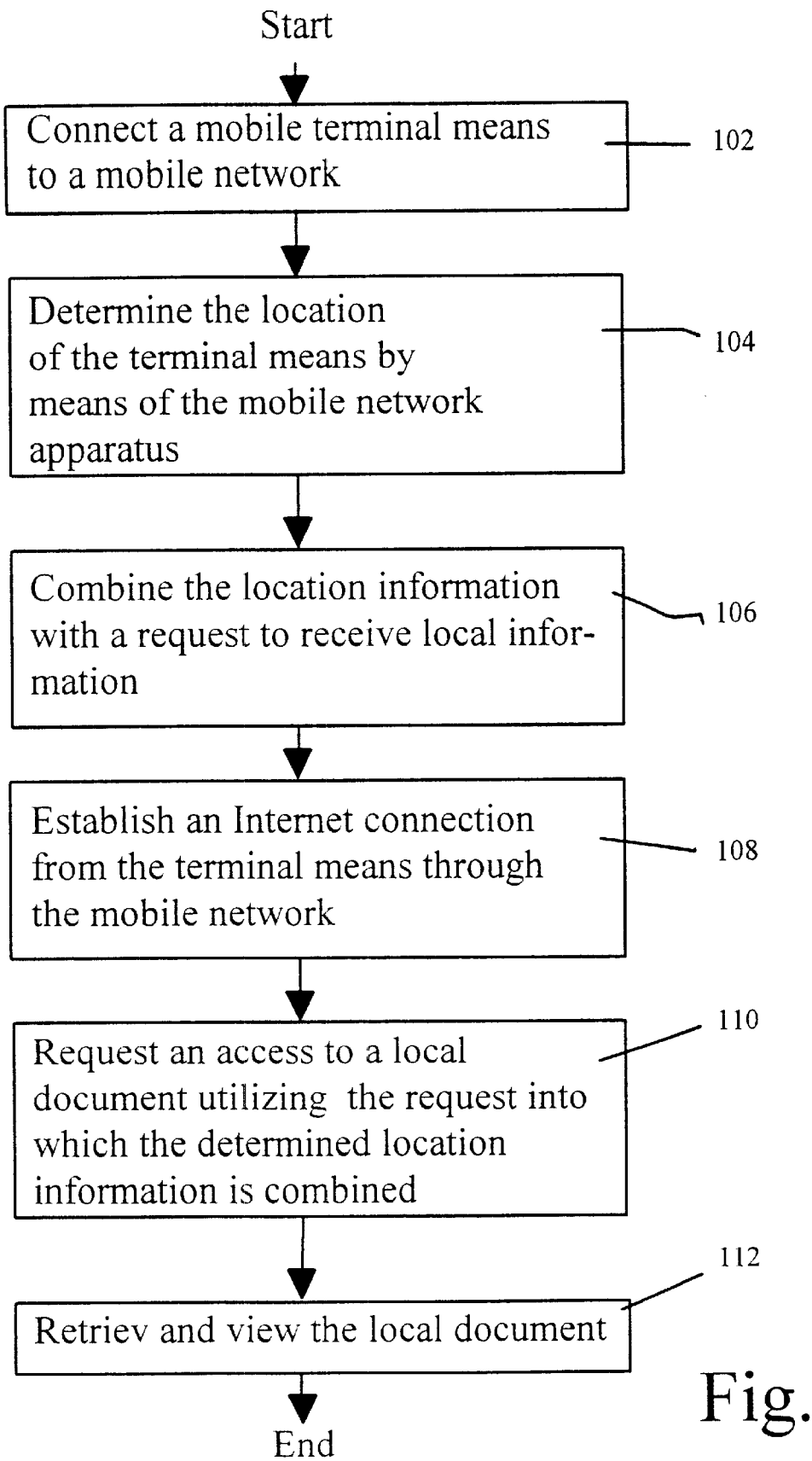
FIGS. 9 and 10 are flow charts illustrating the operation of the present invention.

FIG. 9 discloses the general method steps of one embodiment of the present invention. The operation initiates as the mobile station is connected to a mobile network of some area, step 102, according to the known principles of roaming. At this stage the mobile network becomes aware of the location of the particular mobile station, step 104, as it knows the base station via which the mobile station is communicating.

After the location information, i.e. the current position of the subscriber, is available by the network system, e.g. by the network controller, an indication thereof may be transmitted to the mobile station, e.g. in a form of a standard URL (Uniform Resource Locator). The transmission may utilize any suitable protocol, and be e.g. a SMS (Short Message System) in accordance with one embodiment of this invention. (Exemplifying alternatives for the transmission and operation will be discussed in more detail later in this specification.)

At step 108 the user establishes an Internet connection by the mobile station through the mobile network, as was already explained above. The mobile station has now received the local address information by means of the SMS, and this information is included into the request to receive the actual local information from the Internet available by means of the mobile network system, step 110. The local information may e.g. be a local document retrieved from a WWW server of the Internet. The mobile station can utilize this local address information to specify the request to concern only the local information. After the request, the user will receive the requested document or a selection (or a list) of documents on the basis of the location information, and he/she is able to view this or these documents in a per se known manner, step 112.

The location information is determined by the mobile network, as there are already existing ways and means for accomplishing this. According to the present invention, this location information is then utilized when accessing WWW documents which associate to the determined location information. There are several alternative ways to accomplish this, and these will be now discussed in the following.

Figure 10:
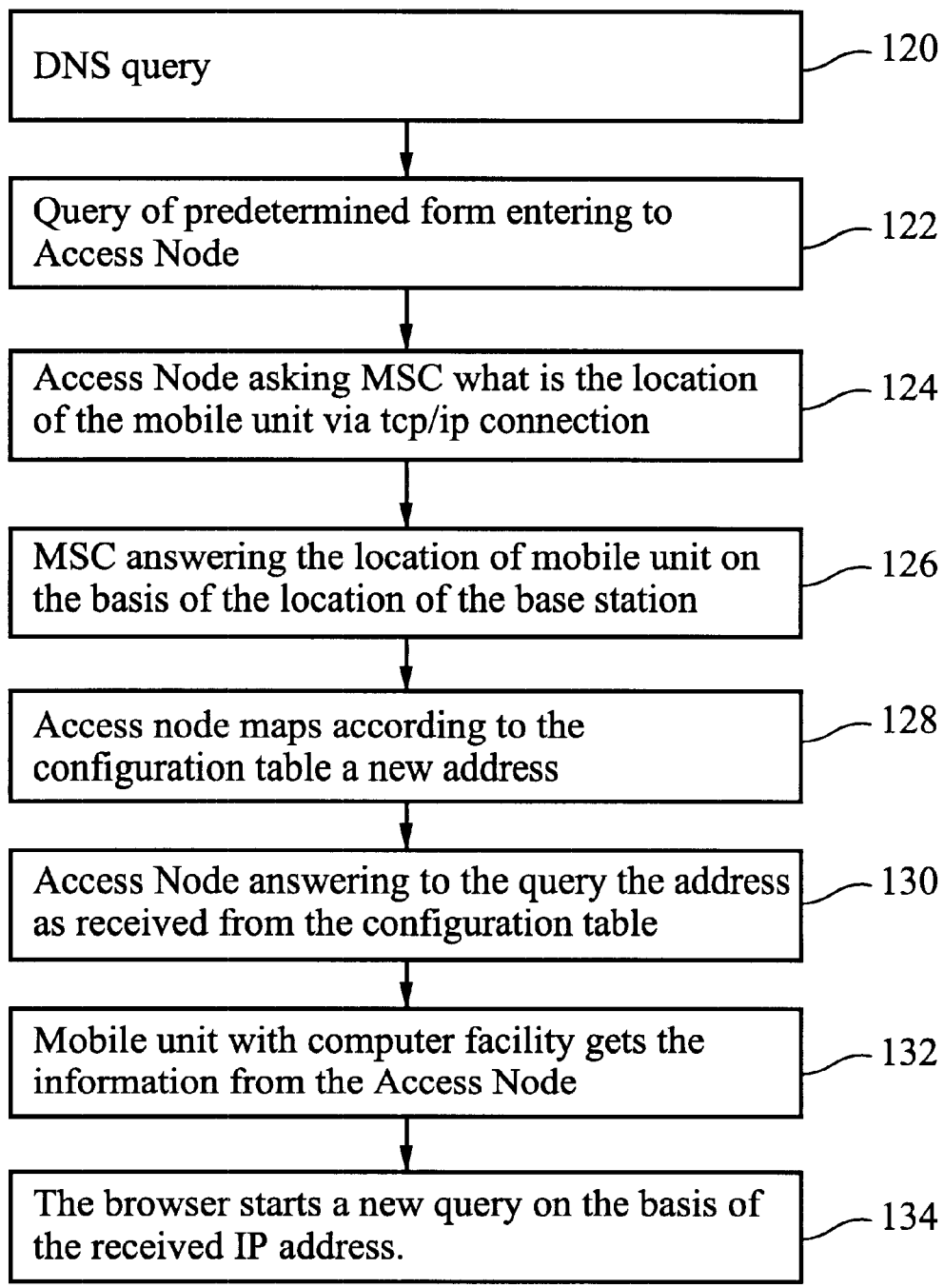

FIG. 10 shows a flow chart for one embodiment. After a connection has been established from the mobile station to the service provider ISP 42, an authentication is performed, and thereafter the user uses his/hers computer and starts to use the browser function thereof. At step 120 the user wishes to do a DNS query. The user writes to the browser window e.g. text "regioninfo.com". In this example this is an address accepted in all places as to form the required information for accessing a predetermined address of the specified feature. At step 122 this address is send to and received by the AN. The AN recognizes that the sent information contains a predetermined information which shall be prosecuted. The AN makes a query to the MSC or VLR containing the location identity of the user in a register thereof. This is performed in step 124 in the GSM based solution by the TCP/IP link. In step 126 the location identity, ie. the base station information is send as a response to the AN. The information of the BS1, geographical location information of the base station concerned and the DNS query are combined in step 128. The AN includes a table where the correspondence of the base stations and the http address or IP address and the area can be found (see e.g. FIG. 6), step 130. The AN 30 sends then the IP address back to the user, who has now an address which is specified by the base station to which the user is currently connected at that time. Thus it is possible for the mobile station provided with a PC to initiate the search by means of this "default" address in step 134.

In case of separate data processing device or WWW browser of the user, such as is the PC+MS 11,12 in FIG. 3, the data processing device 11 is able to read the broadcasted SMS messages directly from the mobile station 12, ie. there is such an operational connection 13 between the data processing device or the browser and the mobile station which is capable of transmitting the SMS messages as the local address information from the mobile station 12 to the data processing device 11. According to one alternative, the user may read the address from the display of the mobile station 12, and then feed it manually to the computer 11.

After receiving the information concerning the local URL through the SMS, the browser will automatically select that precise local URL to be shown to the user as a primary alternative and as a source for the local information. The user is then able to request and browse these documents.

It is possible to broadcast the area information as area SMS messages either periodically, e.g. in two hour or one day intervals. These area SMS messages may include standard codes, one of them including the necessary URLs. The arrangement can also be such that the area information SMS is sent every single time to a mobile station as it roams from one location to another, e.g. from the coverage area of one base station or base station group or one network operator to another. The SMS messages can also be sent either as a common broadcast in certain intervals to all mobile stations within a certain coverage area, or individually to those requesting an update or having just roamed into the area. In addition, the arrangement may be such that only a part of the base stations is broadcasting the SMS to the mobile stations within the area. The area SMSs may also be divided into several types of messages, for example such that a standard code 024 indicates pharmacies, 025 entertainment etc. These codes are based on agreement made between various operators and/or on internationally accepted standards.

According to one alternative the area SMS messages are sent directly to the browser of the computer, e.g. "www.ericsson.se".

According to another embodiment, the SMS can also be used to broadcast the location name (or the area name), ie. the search criteria itself instead of a local URL, to the mobile stations which are within the paging area of the given base stations. This can be e.g. the name of the city, the county, the specific district or even the name of the city sector or quarter. In view of this it is noted that e.g. the GSM system is already capable of notifying the user from the country or the operator area the user is currently connected, even without the SMS.

The local or location information received by the mobile station is passed to the browser implemented in the PC (e.g. a portable computer or a communnicator having a browsing program), which is capable of establishing a connection to a WWW server using the htp protocol. The bttp protocol delivers several pieces of information to the WWW servers, such as the e-mail address to the user, the of the used browser program etc., and thus it is not necessary to "retransmit" this information to the particular WWW server, Thus the only thing needed when using this service is to add the location information to the request. This can be accomplished such that the site information received from the mobile network, e.g. 'helsinki', is automatically set by the mobile station to its place in the URL. The ULR may e.g.

have form "www.location.gsm.com", wherein "location" is then replaced by 'helsinki', whereby the final address "www.helsinki.gsm.com" is provided.

According to a further embodiment, an Internet address is interpreted in a local manner. For instance, the user could direct his/hers browser means to an address "regioninfo.com", whereafter the address "regioninfo.com" is interpreted by the AN in such a manner that the WWW server of the certain area the user is interested in becomes found. To give an example, in Helsinki "regioninfo.com" would point to the IP address 3w.hel.fi and in Stockholm it would point to 3w.stockholm.se. This requires that an AN is aware of the different meanings of the various "regioninfo.com" addresses.

It is possible to arrange the above by means of the access nodes. The users can point their browsers to address "regioninfo", and then the appropriate machine for the address "regioninfo" can be found under the current DNS domain. After receiving this "regioninfo.com" address from the mobile station the access node AN will modify this address in a predefined manner and send it back to the mobile station in a form of corresponding (local) IP address. For instance, in Helsinki the fully qualified domain name of tie local operator would be "regioninfo.helsinki.tele.fi", in case the "tele" would be the abbreviated mobile network operator. The access nod; AN detects from the type of the request packet (announced in the first, ie. data field thereof) that the request relates to local information services, and replaces the DNS address given by the user, e.g. "regioninfo.com" by an appropriate address, e.g. "tapiola.espoo.tele.fi", when the user is connected to a mobile network in Tapiola district of Espoo city in Finland.

Normally the Internet dial-up access calls are terminated at some central point which does not contain any of the location information. However, it is possible to easily provide this information e.g. in instances in which the dial-up call is handled by a mobile network, such as in the Direct Access Unit (DAC) of a MSC, or when the mobile network sends additional information about the current location of the mobile station to the dial-up call termination point. An example of the table containing information about the local addresses relating to certain base stations was discussed in connection with FIG. 6.

In the above the invention is explained in connection with mobile networks or PLMNs (Public Land Mobile Network). However, the invention can also be utilized in arrangement comprising also fixed land line networks.

Thus, the invention provides a method and apparatus by which a significant improvement can be achieved in the area of finding and searching locally related information, such as WWW documents. The arrangement according to the present invention is easy and economical to realize by per se known components. It should be noted that the foregoing examples of the embodiments of the invention are not intended to restrict the scope of the invention defined in the appended claims. All additional embodiments, modifications and applications obvious to those skilled in the art are thus included within the spirit and scope of the invention as set forth by the claims appended hereto.

What is claimed is:

1. A method for finding and providing information for a mobile user terminal through a communications network, comprising:

establishing a connection between the mobile user terminal and a mobile network operationally connected to the communications network;

determining geographical location information of the mobile user terminal via a mobile network apparatus;

sending the geographical location information determined by the mobile network apparatus to the mobile user terminal;

combining automatically the received geographical location information with a request for retrieving local information in the mobile userterminal so as to result in a location-specific address or name;

sending the location-specific address or name for retrieving local information dependent on the geographical location information from the mobile user terminal to the communications network, and retrieving desired local information dependent on the geographical location information as a response to said sending of the location-specific address or name.

2. A method according to claim 1, further including transferring the determined geographical location information to the mobile user terminal in a form of a Uniform Resource Locator (URL) from the communications network.

3. A method according to claim 1, wherein the geographical location information is transmitted to the mobile user terminal in form of a Short Message Service (SMS) message.

4. A method according to claim 3, wherein the SMS messages are broadcasted as group SMS area messages in predefined time intervals.

5. A method for finding and providing information for a mobile user terminal through a communications network, comprising:

establishing a connection between the mobile user terminal and a mobile network operationally connected to the communications network;

determining geographical location information of the mobile user terminal via a mobile network apparatus;

sending a suitable protocol request for retrieving local information, based on a request to receive local information, from the mobile user terminal;

receiving the suitable protocol request into an access node;

converting the suitable protocol request to a location-specific address or name in the access node;

sending the location-specific address or name from the access node to the mobile user terminal;

sending the location-specific address or name from the mobile user terminal to the communications network; and retrieving desired local information dependent on the geographical location information in view of the location-specific address or name sent by the mobile user terminal to the communications network.

6. A method according to claim 5, wherein a special address or name is used in the suitable protocol request to indicate the need for local information.

7. A method according to claim 6, wherein the need for local information is detected from the received suitable protocol request in the access node.

8. A method according to claim 5, wherein a mobile station is used as the mobile user terminal and that the method comprises a step of using at least one of the base stations of the mobile network apparatus for determining the geographical location information of the mobile station.

9. A method according to claim 8, further comprising determining the geographical location information of the mobile station by means of a Visitor Location Register managing information of the mobile stations roaming within an area of a mobile switching centre controlling at least one base station, the mobile terminal being situated within an illumination area thereof.

10. A method according to claim 5, wherein the local information contains document or documents and/or files stored in at least one WWW server of a global Internet or operationally similar server operationally connected to the communications network.

11. A method according to claim 5, further comprising combining the geographical location information and a Domain Name Server (DNS) query to form an Internet address which points to a server or servers including documents containing local information.

12. A method according to claim 5, further including browsing local information documents, which are dependent on the geographical location information, by means of the mobile user terminal.

13. An arrangement for finding and providing information for a mobile user terminal through a communications network, comprising:

means for establishing a connection between the mobile user terminal and a mobile network apparatus;

a mobile network apparatus for determining geographical location information of the mobile user terminal;

means for combining automatically the geographical location information with a request for retrieving local information in the mobile user terminal resulting in a location-specific address or name; and a mobile user terminal sending the location-specific address or name for retrieving local information dependent upon the geographical location information from the mobile user terminal to the communications network, and retrieving desired local information dependent on the geographical location information.

14. An arrangement according to claim 13, wherein the mobile network apparatus for determining the geographical location information comprises:

at least one base station;

control means for determining the geographical location on basis of information received from the at least one base station, and means for transmitting the geographical location information to the mobile user terminal.

15. An arrangement according to claim 13, wherein the local information contains document or documents and/or files stored in at least one WWW server of a global Internet or operationally similar server operationally connected to the communications network.

16. An arrangement according to claim 13, further comprising means for browsing local information documents, which are dependent on the geographical location information.

17. An arrangement for finding and providing information for a mobile user terminal through a communications network, comprising:

means for establishing a connection between the mobile user terminal and a mobile network apparatus;

a mobile network apparatus for determining geographical location information of the mobile user terminal;

a mobile user terminal sending a suitable protocol request for retrieving local information from the mobile user terminal, sending a location-specific address or name to the communications network and retrieving desired local information dependent on the geographical location information, and means for determining the location-specific address or name by combining the geographical location information with the request for retrieving location information dependent on the geographical location information and sending the location-specific address or name to the mobile user terminal so that the mobile user terminal can send the location-specific address or name to the communications network to retrieve the desired local information.

18. An arrangement according to claim 17, wherein the means for combining the geographical location information with the request for retrieving local information dependent on the geographical location information is arranged in the network apparatus, such as in an access node enabling the access into the communications network or into the mobile switching center.

19. An arrangement according to claim 17, wherein the mobile user terminal comprises a mobile station and a data processing device operationally connected to the mobile station.

20. An arrangement according to claim 19, wherein the mobile station and data processing device form an integrated unit.

21. A mobile user terminal arranged to communicate with a mobile network, the mobile network being arranged to determine the current geographic location information of the mobile user terminal, the mobile station comprising:

means for establishing a connection to a communications network through the mobile network;

means for combining the geographic location information determined by the mobile network with a suitable protocol request to result in a location-specific address or name for retrieving local information dependent on the geographical location information from the communications network;

wherein a mobile user terminal sends from the mobile user terminal the location-specific address or name for retrieving local information, and retrieves desired local information dependent on the geographic location information.

22. A mobile user terminal according to claim 21, wherein the means for combining comprise a data processing device operationally connected to the mobile user terminal.

23. A mobile user terminal according to claim 22, wherein the mobile station and data processing device form an integrated unit.

* * * * *